United States Patent
Dancy

[15] 3,656,931
[45] Apr. 18, 1972

[54] PREPARATION OF AMMONIUM ORTHO-PHOSPHATE AGRICULTURAL SUSPENSIONS

[72] Inventor: William B. Dancy, Lakeland, Fla.
[73] Assignee: International Minerals & Chemical Corporation
[22] Filed: Aug. 26, 1968
[21] Appl. No.: 755,395

[52] U.S. Cl. ........................ 71/33, 71/34, 71/44, 71/46, 71/64 C, 99/2
[51] Int. Cl. ................ C05b 7/00, C05b 9/00, C05b 13/00
[58] Field of Search ................ 71/34, 64 C, 33, 44, 46

[56] References Cited

UNITED STATES PATENTS

| | | | |
|---|---|---|---|
| 3,019,099 | 1/1962 | Walters | 71/34 |
| 3,155,490 | 11/1964 | DeLapp | 71/43 X |
| 3,249,421 | 5/1966 | Bigot et al. | 71/43 X |
| 3,285,731 | 11/1966 | Salutsky et al. | 71/33 |
| 3,320,048 | 5/1967 | Legal et al. | 71/33 X |
| 3,342,579 | 9/1967 | Frazier | 71/34 |
| 3,464,808 | 9/1969 | Kearns | 71/34 |

FOREIGN PATENTS OR APPLICATIONS

| | | | |
|---|---|---|---|
| 855,104 | 11/1952 | Germany | 71/36 |

*Primary Examiner*—Reuben Friedman
*Assistant Examiner*—Bennett H. Levenson
*Attorney*—James E. Wolber and Peter Andress

[57] ABSTRACT

Wet process phosphoric acid containing iron, aluminum or magnesium compounds as impurities is ammoniated to produce an ammonium phosphate having a gelatinous, colloidal component of iron, aluminum or magnesium ammonium phosphate, the ammonium phosphate is heated to dehydrate the gel structure under conditions to prevent the formation of polyphosphates, and the dried material is comminuted to finely divided particles that produce a stable aqueous suspension when dispersed in water. A water soluble magnesium compound may be added to the phosphoric acid, thereby providing magnesium ammonium phosphate in the product.

8 Claims, No Drawings

PREPARATION OF AMMONIUM ORTHO-PHOSPHATE AGRICULTURAL SUSPENSIONS

BACKGROUND OF THE INVENTION

Fertilizers commonly are applied to fields either as dry solids or as liquid slurries. Since slurry fertilizers offer certain advantages their use has grown rapidly in the past several years and continued growth seems likely.

Slurry fertilizers evolved from the practice of applying concentrated nitrogen solutions directly to the soil. Ease of application and lower distribution costs prompted the agricultural industry to add other major nutrients such as phosphate and potassium and thereby provide multicomponent solutions. Solubility of some ingredients is limited, however, so that application of such nutrients requires relatively dilute solutions. Thus it is impractical to use solutions for the application of large amounts per acre of the more insoluble nutrients. As a result, true fertilizer solutions evolved into slurries so that the concentration of any ingredient need not be limited by its solubility.

The potential for slurry fertilizers is, of course, significantly affected by the economics of the components suitable for use in slurries. In this regard wet process phosphoric acid presents a potentially economic source of phosphate and ammonia presents a potentially economic source of nitrogen. Wet process phosphoric acid is an impure product containing dissolved calcium sulfate, fluorides and fluosilicates, and salts, (e.g., phosphates) of aluminum, iron, magnesium and other metals. Unfortunately, ammoniation of wet process phosphoric acid results in the formation of colloidal gelatinous phosphates which clog slurry distribution equipment. During ammoniation of the wet process acid the iron and aluminum components of the acid are precipitated as colloidal gelatinous phosphates. Magnesium, present in acid made from high-magnesium phosphate rock (e.g., North Carolina and Western Rock) also forms colloidal magnesium ammonium phosphate. The degree and type of gelling frequently is unpredictable.

The art has attempted to cope with the gel-forming propensity of iron and aluminum by ammoniating relatively expensive superphosphoric acid that contains, for example, 40 percent or more condensed polyphosphates to form an ammonium polyphosphate solution which may analyze 10–34–0. The condensed polyphosphates sequester iron and aluminum and prevent them from forming colloidal precipitates during the ammoniation. Magnesium is not effectively sequestered by the superphosphoric acid, however, so that magnesium presents a constant source of trouble.

It has also been suggested in U.S. Pat. No. 3,022,153 that urea be added to the wet process phosphoric acid to complex with iron and aluminum phosphates and that the acid thereafter be ammoniated. The solution, however, is apparently not stable over long periods of time or in the presence of potassium salts which are, of course, required if a complete fertilizer slurry is desired.

Others appear to accept the fact that gels will form and attempt to provide gels which at least minimize the disadvantages presented by the normal ammoniation of wet process phosphoric acid. These approaches include regulation of the concentration of trivalent metals so that ammoniation will form thixotropic gels (U.S. Pat. No. 3,041,160) and the use of agitation at 140° to 190° F. to form thin gels (U.S. Pat. No. 2,799,563).

For much the same reasons applicable to slurry fertilizers, the gelling tendency of the iron, aluminum and magnesium impurities limits the usefulness of ammoniated wet process phosphoric acid as a reliable source of nitrogen and phosphate in liquid animal feed supplements. The presence of colloidal gelatinous phosphates also clogs conventional liquid animal feed handling systems.

SUMMARY OF THE INVENTION

In accordance with this invention there is provided a process which comprises ammoniating phosphoric acid containing incidental metallic impurities selected from the group consisting of iron, aluminum and magnesium and mixtures thereof to provide an ammonium-containing phosphate having a gelatinous, colloidal component selected from the group consisting of iron, aluminum and magnesium ammonium phosphates and mixtures thereof, drying said ammonium-containing phosphate under conditions sufficient to dehydrate the gel structure of the gelatinous component, comminuting said ammonium-containing phosphate to finely divided particles substantially all of which pass through a 35 mesh (Tyler standard) screen, and dispersing said particles in water to form an aqueous suspension. The phosphoric acid is typically a wet process phosphoric acid containing normally incident impurities selected from the group consisting of iron, aluminum and magnesium compounds and mixtures thereof which precipitate as gelatinous solids upon neutralization of the acid with ammonia. In a preferred embodiment, the dried phosphate is comminuted in the presence of water to provide directly a stable aqueous suspension.

Stable suspensions containing metal ammonium phosphates selected from the group consisting of iron, aluminum and magnesium ammonium phosphates and mixtures thereof in which said metal ammonium phosphates are present as finely divided dehydrated particles are also contemplated by this invention. These metal ammonium phosphates actually serve as viscosity builders so that it is not necessary to add viscosity-building clays to maintain undissolved solids in suspension.

It has been discovered that the troublesome colloidal gelatinous nature of iron, aluminum and magnesium phosphates can be eliminated and a material suitable for stable slurries provided if an ammonium phosphate having a colloidal gelatinous component is dried and the dried ammonium phosphate is then finely comminuted. Colloidal gelatinous iron, aluminum and/or magnesium ammonium phosphates are formed during the ammoniation of phosphoric acid containing iron, aluminum or magnesium but the gel structure is destroyed by drying to dehydrate. The ammonium phosphates, when finely comminuted, are most appropriate for use in stable aqueous slurries. The matrix that results when the dehydrated product is mixed with water is friable, and the water insoluble metal phosphates are readily dispersed by wet comminution. It has been determined that once the gel structure is destroyed by dehydration, the iron, aluminum and magnesium ammonium phosphates behave essentially as inert solids in the aqueous suspension and show substantially no tendency to hydrate or react to reform troublesome gels even though they are present in extremely finely divided form.

When, for example, ammonium phosphate produced from wet process phosphoric acid is treated in accordance with this invention to provide finely divided ammonium phosphate slurries, the iron and aluminum phosphates act as inert weighting agents that actually improve the stability of the slurry. Moreover, since the iron, aluminum and magnesium phosphates are broken up into fine inert particles that readily disperse to provide a stable suspension, ammonium phosphates produced by ammoniation of defluorinated wet process phosphoric acid can be employed for liquid animal feed supplements. The finely dispersed phosphates do not reform gels and do not clog conventional liquid animal feed handling systems. The suspensions of this invention are stable, i.e., at most may need only occasional agitation if some sedimentation tends to occur. The commercial practice of agitating suspension fertilizers in product storage tanks once or twice a day with air spargers or mechanical agitators will maintain complete homogeneity of the suspensions of this invention.

DESCRIPTION OF THE PREFERRED EMBODIMENTS

The wet process phosphoric acid which now readily may be employed as a phosphate source for ammonium phosphates is well-known to the art. Phosphate rock often is acidulated with sulphuric acid albeit other mineral acids such as hydrochloric acid, nitric acid or the like also may be employed. Following acidulation insoluble impurities such as, for example, calcium sulphate and the like are removed to provide a phosphoric acid that may contain metallic impurities such as iron, aluminum or magnesium. Wet process acid can range in $P_2O_5$ concentration of from about 25 percent to about 55 percent and is available as a standard article of commerce. The quantity of the iron, aluminum or magnesium-containing impurities in the wet process acid will, of course, vary depending upon the source of the phosphate rock from which the wet process acid is manufactured. A representative 54% $P_2O_5$ phosphoric acid produced from a Florida phosphate rock may contain as much as about 4.5 percent iron and aluminum ($Fe_2O_3$ and $Al_2O_3$), commonly referred to as "I & A," and as much as about 0.75 percent magnesium (as MgO). North Carolina rock that is high in magnesium may provide a 54 percent acid having as much as 2 percent magnesium. The iron and aluminum are the primary sources of gelling difficulties. It has been determined that gel formation will become troublesome when the metal-containing impurities are present in the wet process phosphoric acid in amounts producing a weight ratio of the metal content expressed as oxides, e.g., $Fe_2O_3$ and $Al_2O_3$, to the $P_2O_5$ content of the acid greater than about 0.05. To the extent that other metals which are present to some degree in wet process acid may be a potential source of gelling difficulties, they are also inactivated by the practice of this invention.

Ammoniation of wet process phosphoric acid to form ammonium phosphates is well-known to the art. Monoammonium phosphate may be produced by ammoniating phosphoric acid to form a monoammonium phosphate slurry which is added to a blunger with undersize product and then dried to provide dry granules. An appropriate process is described, inter alia, in Industrial & *Engineering Chemistry*, 41, pp. 1318-24 (1949). Diammonium phosphate may be produced as described, inter alia, in U.S. Pat. No. 3,153,574. Wet process phosphoric acid is first pre-neutralized with ammonia to form an ammonium phosphate slurry. The slurry, additional ammonia, and undersize final product then are introduced into an inclined rolling bed of discrete particles. The process may be controlled so that the heat of reaction produces dry diammonium phosphate particles from the lower end of the rolling bed. If desired, the particles may be dried in a rotary dryer. The process of U.S. Pat. No. 3,153,574 can also be employed for the production of monoammonium phosphate. In this event the total ammoniation can be accomplished in the pre-neutralizer if desired.

In the event that an ammonium phosphate is desired containing a higher magnesium content than that afforded by the magnesium normally present in phosphoric acid, a magnesium source may be added during the ammonia neutralization of phosphoric acid. For example, in the production of diammonium phosphate as outlined in U.S. Pat. No. 3,153,574, the phosphoric acid is first pre-neutralized to a $N:P_2O_5$ mole ratio of about 0.8 to 1.2 to form an ammonium phosphate slurry, which is fed to an ammoniator-granulator where the remaining ammonia and magnesium source are introduced. Most appropriately magnesium contents of up to 16 percent (as MgO dry basis) or more can be provided by adding a water soluble magnesium salt such as magnesium chloride, magnesium sulfate, magnesium carbonate or a magnesium salt in conjunction with a potassium salt as contained in minerals such as langbeinite, leonite, kainite, schoenite or the like to the inclined rolling bed of discrete particles which is being ammoniated.

Magnesium ammonium phosphate also can be prepared by the reaction of magnesium oxide, a magnesium salt or a magnesium mineral with phosphoric acid, subsequent treatment of the slurry thus obtained with ammonia and drying. An appropriate process is described, inter alia, in U.S. Pat. No. 2,977,213. When magnesium ammonium phosphate is prepared by the ammoniation of wet process phosphoric acid in the presence of magnesium, not only the magnesium but the ferric iron and aluminum impurities of the wet process acid as well will tend to form gelatinous colloidal impurities. By heating the product until it has a moisture content of less than about 2 percent such gel structure is dehydrated and the finely comminuted material becomes well suited for stable suspensions.

The term ammonium-containing phosphate as employed herein includes ammonium phosphate, magnesium ammonium phosphate and mixtures thereof. The term ammonium phosphate includes mono-ammonium phosphate, diammonium phosphate and mixtures thereof. The phosphates described herein are understood by the art to be ortho phosphates, free from polyphosphates.

The equipment employed to dry ammonium phosphates and dehydrate the metal phosphate gels is not critical to the practice of this invention. For example conventional rotary dryers readily can be employed in order to drive off the water of crystallization and dehydrate the metal phosphate gel. The final moisture content of the dry product is preferably less than about 2 percent, and more preferably from about 1 to about 1.5 percent, by weight. The final moisture contents are readily attained in conventional drying equipment. Generally the particles should be dried at a temperature of at least about 130° F., with a drying temperature within the range of from about 150° to about 200° F. being preferred, no polyphosphates being formed at these temperatures.

A wide variety of standard equipment appropriately may be employed to comminute the dry ammonium phosphates. Such equipment includes, without limitation, ball mills, rod mills, roller mills, pug mills, hammer mills, colloid mills or the like. The comminution step is employed to disintegrate the particles to a size appropriate for stable suspensions. The amount of comminution is a matter of choice and frequently becomes a balance between economics and an acceptable minor tendency toward sedimentation. The most desirable particle size is also a function to some extent of the inherent viscosity of the aqueous medium. In this regard, high shear agitation tends to be less effective in breaking down the phosphate particles but may be feasible for suspensions designed for animal feeds since animal feeds frequently contain molasses which increases their viscosity.

It has been determined that milling to provide −35 mesh particles is most appropriate for the stable aqueous suspensions of this invention. Milling so that all particles pass 35 mesh provides a comminuted product in which often over 90 percent of the particles pass through 200 mesh. Generally a preponderance of the particles pass through a 325 mesh. Generally finer particles produce the more stable slurries and particles should be as finely ground as practicable.

Wet comminuting readily provides stable suspensions in a single step and constitutes one preferred embodiment of this invention. Dry comminuting may be employed for ammonium phosphates but the equipment tends to glaze. It has been determined that this tendency to glaze may be substantially reduced if the ammonium phosphates are dry comminuted in the presence of finely divided nitrogen-free nutrient solids such as potassium chloride, potassium sulfate, kieserite, $MgSO_4·H_2O$, langbeinite, and other salts which are not sensitive to the temperatures and pressures generated during the dry comminution operation. Dry comminution in the presence of nutrient solids and desirably potash nutrient solids constitutes another preferred embodiment of this invention.

The stable agricultural suspensions can, of course, contain other inert agricultural materials in suitably divided form. Thus, the suspensions may also contain, for example, calcium phosphate; potash such as potassium chloride or potassium sulfate; urea; sulfur; and trace minerals such as manganese, boron, copper and the like. In the case of animal feed supplements defluorinated phosphates are employed and the suspension may, in addition, contain carbohydrates, proteins, antibiotics, vitamins and the like.

Suspensions can be formulated to provide a wide variety of concentrations. The upper allowable viscosity of any given suspension is, of course, a function of the particular apparatus in which the suspension will be handled and applied. Generally, the viscosities will be below about 2,000 cp. at 78° F. and for some applications the viscosity of the slurry desirably will be below 1,000 cp. at 78° F. The viscosity of the slurry is a function both of the concentration of suspended solids and the inherent viscosity of the liquid. As soluble components go into solution the inherent viscosity of the liquid changes. To the extent any proposed formulation exceeds an acceptable viscosity, the viscosity of the suspension readily may be lowered simply by adding additional water.

The following examples are included for illustrative purposes only and are not intended to limit the scope of this invention. In the examples and specification fertilizer analyses are normally given as weight percents in the order $N-P_2O_5-K_2O$. When magnesium is present as a fertilizer nutrient the order of analysis is $N-P_2O_5-K_2O-MgO$. However, the analyses given in Example VII are weight percents in the order N—P—K since it is the practice in the feed supplement art to identify the elements rather than the oxides of phosphorus and potassium. Mesh sizes referred to in this specification are Tyler mesh.

EXAMPLE I

A 54% $P_2O_5$ wet process phosphoric acid containing about 4.3% I and A ($Fe_2O_3+Al_2O_3$) obtained by acidulating Florida phosphate rock with sulphuric acid was ammoniated to provide monoammonium phosphate (13–52–0). The monoammonium phosphate was dried in a rotary dryer to a moisture content of about 1.5 percent and screened to provide an 8 × 14 mesh (−8 +14 mesh) dry granular product. During drying the particles reached an average particle temperature of about 180° F.

Two thousand grams of the 8 × 14 mesh monoammonium phosphate (13–52–0) and 1,060 grams of water were milled in a rod mill for 10 minutes to reduce the particle size of the monoammonium phosphate to −35 mesh. The resulting slurry had a nutrient content of approximately 8.5–34–0 and was characterized by a viscosity of 250 cp. at 81° F. after four days of static storage. The slurry remained fluid after 2½ weeks of static storage and its viscosity measured 560 cp. at 82° F. Slight periodic agitation may be desirable to prevent sedimentation during long periods of storage.

EXAMPLE II

Muriate (potassium chloride having a nutrient content of about 60% $K_2O$) was pulverized to provide a −35 mesh material having the following screen analyses:

| Mesh | % Cumulative |
|---|---|
| +65 | 3.9 |
| +100 | 10.4 |
| −100 | 89.6 |

Fifteen hundred grams of the 13–52–0 monoammonium phosphate of Example I were rotated in a rod mill for 30 minutes to comminute all particles to −35 mesh. Thirteen hundred grams of the pulverized muriate then were added to the pulverized monoammonium phosphate and the rod mill was operated for 10 minutes to ensure complete mixing of the raw materials. Five hundred grams of the mixture, having a calculated nutrient content of about 7–28–28, were stirred into 200.5 grams of water to provide a stable slurry having a calculated nutrient content of about 5–20–20. The viscosity of the slurry after 3 days was 1,720 cp. at 81° F. The slurry remained fluid after 3 weeks of static storage.

While the process described in this example produced a stable slurry the rods of the ball mill tended to glaze.

EXAMPLE III

Seven hundred and twenty grams of the 13–52–0 ammonium phosphate of Example I were dry milled in a rod mill for 20 minutes and 1,250 grams of the pulverized muriate of Example II was added. The materials were intimately mixed to provide a mixture having a nutrient content of about 4.8–19–38. Four hundred grams of the mixture were stirred in 142.8 grams of water to provide a slurry fertilizer having a nutrient content of about 3.5–14–28.

The viscosity of the slurry after 3 days of static storage was 1,345 cp. at 81° F. The slurry remained fluid after 3 weeks of static storage.

EXAMPLE IV

A slurry having a nutrient content of about 3–12–24 was prepared by mixing 140.7 parts of the 8.5–34–0 slurry of Example I, 160.1 parts of pulverized muriate of Example II and 99.2 parts of water. The final slurry was characterized by a viscosity of 372 cp. at 82° F. While slight periodic agitation was desirable to prevent sedimentation, no gel formation was observed.

EXAMPLE V

A slurry having a nutrient content of about 3.25–13–26 was prepared employing 153.2 parts of the 8.5–34–0 slurry of Example I, 173.6 parts of the pulverized muriate of Example II and 73.2 parts of water. The resulting slurry was characterized by a viscosity of 1,550 cp. at 82° F.

EXAMPLE VI

A 54% $P_2O_5$ wet process phosphoric acid containing 4.3% I and A obtained by acidulating Florida phosphate rock with sulphuric acid was ammoniated to provide a diammonium phosphate (18–46–0). The diammonium phosphate was dried in a rotary kiln to a moisture content of about 1.5 percent. During drying the particles reached an average particle temperature of about 180° F.

A slurry fertilizer having a nutrient content of about 7–21–21 was prepared from 1,220 parts of 18–46–0 diammonium phosphate, 174 parts of the 54 percent wet process phosphoric acid, 1,140 parts of 58% $K_2O$ muriate (35 × 200 mesh) and 638 parts of water. The ingredients were wet milled in a rod mill for 15 minutes at ambient temperature to provide a slurry having a viscosity of 850 cp. at 23° C. The iron and aluminum phosphates present served as viscosity builders so that attapulgite or other viscosity building clays were not necessary to maintain the undissolved solids in suspension.

EXAMPLE VII

Dry granular feed-grade diammonium phosphate (18–20–0) was mixed with urea and water to provide a 20–11.5–0 liquid animal feed supplement. The liquid feed supplement was prepared by mixing 2,160 parts of diammonium phosphate, 810 parts of urea and 800 parts of water. The ingredients were wet milled in a ball mill for 15 minutes at ambient temperatures to provide a stable slurry containing 21 percent water.

EXAMPLE VIII

A slow release fertilizer was prepared by reacting langbeinite (double sulphate of potash-magnesia), wet process phosphoric acid, and ammonia. The slow release fertilizer containing magnesium ammonium phosphate was dried to a moisture content below 1.5 percent to provide a fertilizer having an analysis as follows:

| Nutrient | Wt. % |
|---|---|
| N | 9.8 |
| $P_2O_5$ | 17.7 |
| $K_2O$ | 11.3 |
| MgO | 8.8 |

A slurry was formed employing 873 grams of the slow release fertilizer, 533 grams of diammonium phosphate, 68 grams of a 30 percent nitrogen aqueous solution, and 523 grams of water. The ingredients were mixed in a rod mill and the rod milled for 15 minutes. Five hundred and five grams of the pulverized muriate of Example II were added to the slurry and the rod mill was rotated for a few additional revolutions to homogenize the slurry.

The slurry obtained from the rod mill was about a 8-16-16-3 composition. This slurry was too viscous for normal fertilizer distribution, and therefore, 167 grams of water were added to decrease the viscosity. The final slurry was characterized by a nutrient content of about 7.5-15-15-2.8 and remained free flowing after 4 days of static storage. The viscosity of the slurry was 775 cp. at 81° F.

The free flowing slurry of Example VIII is in direct contrast to the slurry formed when soluble magnesium is added in conjunction with an ammonium phosphate. Water, aqueous ammonia, comminuted (−35 mesh) diammonium phosphate produced according to this invention, pulverized langbeinite and pulverized 60% $K_2O$ muriate were mixed to provide a slurry that had a nutrient content of about 7.5-15-15-2.8. While this latter formulation initially resulted in a fluid slurry, the slurry had completely gelled to form a solid mass after standing overnight.

Since modifications of the invention will be apparent to those skilled in the art it is intended that the invention be limited only by the scope of the appended claims.

I claim:

1. A process for forming aqueous fertilizer and animal feed supplement suspensions which comprises ammoniating phosphoric acid containing gel-forming impurities which are compounds of metals from the group consisting of iron, aluminum, magnesium and mixtures thereof, said impurities being present in amounts producing a weight ratio of said metals expressed as oxides, to the $P_2O_5$ content of the acid, which is greater than about 0.05, thereby obtaining an ammonium-containing phosphate having gelatinous, colloidal impurities therein, heating said ammonium-containing phosphate at a temperature within the range of about 130° to about 200° F. to dehydrate the gel structure of said gelatinous, colloidal impurities and obtain a dried ortho-phosphate product, free from polyphosphates, having a moisture content of less than about 2 percent by weight, comminuting said dehydrated ammonium-containing phosphate to finely-divided particles substantially all of which pass through a 35 mesh screen, Tyler standard, and dispersing said dehydrated particles in water whereby an aqueous suspension is formed.

2. The process of claim wherein said phosphoric acid is a wet process phosphoric acid containing normally incident iron and aluminum impurities.

3. The process of claim 2 wherein said ammonium-containing phosphate is dried at a temperature of from about 150° to about 200° F.

4. The process of claim 3 wherein said dehydrated ammonium-containing phosphate is comminuted in the presence of water to provide a stable aqueous suspension.

5. The process of claim 4 wherein said wet process phosphoric acid is ammoniated in the presence of an added water-soluble magnesium compound to provide a composition containing magnesium ammonium phosphate.

6. The process of claim 5 wherein the magnesium compound is a magnesium mineral containing a magnesium salt and a potassium salt.

7. An aqueous suspension consisting essentially of a suspension in water of a finely divided ammonium-containing phosphate produced from wet process phosphoric acid by ammoniating wet process phosphoric acid containing gel-forming impurities which are compounds of metals from the group consisting of iron, aluminum, magnesium and mixtures thereof, said impurities being present in amounts producing a weight ratio of said metals expressed as oxides, to the $P_2O_5$ content of the acid, which is greater than about 0.05, thereby obtaining an ammonium-containing phosphate having gelatinous colloidal impurities therein, heating said ammonium-containing phosphate at a temperature within the range of about 130° to about 200° F. to dehydrate the gel structure of said gelatinous, colloidal impurities and obtain a dried orthophosphate product, free from polyphosphates, having a moisture content of less than about 2 percent by weight, comminuting said dehydrated ammonium-containing phosphate to finely divided particles substantially all of which pass through a 35 mesh screen, Tyler Standard, and dispersing said dehydrated particles in water whereby an aqueous suspension is formed.

8. The aqueous suspension of claim 7 containing a mixture of iron and aluminum ammonium phosphates.

* * * * *

PO-1050
(5/69)

UNITED STATES PATENT OFFICE
CERTIFICATE OF CORRECTION

Patent No. 3,656,931               Dated    April 18, 1972

Inventor(s)    William B. Dancy

It is certified that error appears in the above-identified patent and that said Letters Patent are hereby corrected as shown below:

Column 6, line 37, "7-21-2" should read -- 7-21-21--;
               line 38, "1" should be eliminated.

Column 6, line 50, "(18-20-0" should read --(18-20-0)--;
               line 51, ")" should be eliminated.

Column 8, line 3, after "claim", --1-- should be added.

Signed and sealed this 2nd day of January 1973.

(SEAL)
Attest:

EDWARD M. FLETCHER, JR.            ROBERT GOTTSCHALK
Attesting Officer                   Commissioner of Patents